United States Patent [19]

Armour

[11] 3,851,613

[45] Dec. 3, 1974

[54] TIE LINE CLAMP ASSEMBLY

[75] Inventor: Philip D. Armour, Tupelo, Miss.

[73] Assignee: Ingenious Devices, Inc., Tupelo, Miss.

[22] Filed: May 29, 1973

[21] Appl. No.: 364,482

[52] U.S. Cl............... 114/230, 114/199, 188/65.1, 24/124, 24/262, 242/107.2, 242/106
[51] Int. Cl.......................................... B63b 21/08
[58] Field of Search........ 114/230, 199, 215, 235 F; 188/65.1, 67; 24/124, 262; 242/107.2, 106

[56] References Cited
UNITED STATES PATENTS

| | | | |
|---|---|---|---|
| 545,761 | 9/1895 | Barker | 24/124 |
| 1,811,400 | 6/1931 | McClellan | 114/230 |
| 2,148,284 | 2/1939 | White | 114/199 |
| 2,272,185 | 2/1942 | Chittenden | 24/124 |
| 2,338,385 | 1/1944 | Sorensen | 188/65.1 |
| 2,636,466 | 4/1953 | Klippel | 188/65.1 |
| 2,900,148 | 8/1959 | Nickels | 188/67 X |
| 3,020,670 | 2/1962 | Lockhart | 24/124 X |
| 3,135,033 | 6/1964 | Jackson | 24/124 X |

*Primary Examiner*—George E. A. Halvosa
*Assistant Examiner*—Edward R. Kazenske
*Attorney, Agent, or Firm*—Watson, Cole, Grindle & Watson

[57] ABSTRACT

Clamp assembly for a boat tie line includes a reel for the line mounted on the boat to be tied down, and a clamp for clamping the line including a hollow threaded nut and bolt having coaxial openings through which the tie line extends, a resilient annular gasket disposed within the hollow bolt and surrounding the tie line, and an annular flange on the nut for pressing against the gasket so that when the nut is tightened the gasket is compressed and its annular opening constricts against the surrounded tie line to clamp it in place.

3 Claims, 5 Drawing Figures

PATENTED DEC 3 1974  3,851,613

FIG.1
FIG.2
FIG.3
FIG.4
FIG.5

TIE LINE CLAMP ASSEMBLY

This invention relates generally to a clamp assembly and more particularly to such an assembly for quickly and effectively clamping down a tie line to effect a fixed length thereof for mooring a boat.

Most small boats are equipped with deck mounted cleats about which the tie line is wrapped for mooring of the boat. Excessive movement of the docked boat, however, oftentimes results in a loosening of the tie line about the cleat with consequent damage to the boat or adjacent pier. A spring-reeled tie line equipped with a braking or hold-down mechanism has therefore been heretofore used for maintaining some pre-determined length for the tie line during mooring. Nevertheless, the braking mechanisms for such spring reels are not altogether reliable since excessive boat movement has a tendency to accidentally release the brake. Moreover, such prior art devices are cumbersome and relatively expensive, thereby decreasing their desirability for widespread use.

It is therefore an object of the present invention to provide a clamp assembly for a boat tie line which serves to positively and tightly engage the tie line at a predetermined payed-out length from the reel without the tendency for external release, such assembly also being of rugged construction, economical to produce and simple to operate.

Another object of this invention is to provide such a clamp assembly wherein the means for clamping the line includes a threadedly engaged hollow nut and bolt through which the tie line extends with the bolt being secured to the boat deck, a resilient annular gasket disposed within the hollow bolt and surrounding the tie line, and means on the nut overlying the gasket and pressing thereagainst so that as the nut is tightened over the bolt, the gasket is compressed and its annular opening is constricted against the surrounded tie line to clamp it in place.

A further object of this invention is to provide such a clamp assembly in which the nut has an inwardly directed flange for compressing the gasket and causing it to be squeezed against the surrounded tie line.

Other objects, advantages and novel features of the invention will become apparent from the following detailed description of the invention when taken in conjunction with the accompanying drawings wherein:

FIG. 1 is a perspective view showing a portion of a small boat moored in its dock with the use of the clamp assembly of the present invention;

FIG. 2 is a side elevational view partly in section showing the details of the clamp assembly with the tie line in its fully retracted position on the reel;

FIG. 3 is a view similar to FIG. 2 except that the tie line is shown clamped down after having been payed-out a predetermined length from its reel;

FIG. 4 is a sectional view of a portion of the reel taken along the line 4—4 of FIG. 2; and FIG. 5 is an axial sectional view of the bushing which surrounds the tie line and rests against the gasket.

Figures 1, 2, 3, 4, 5:
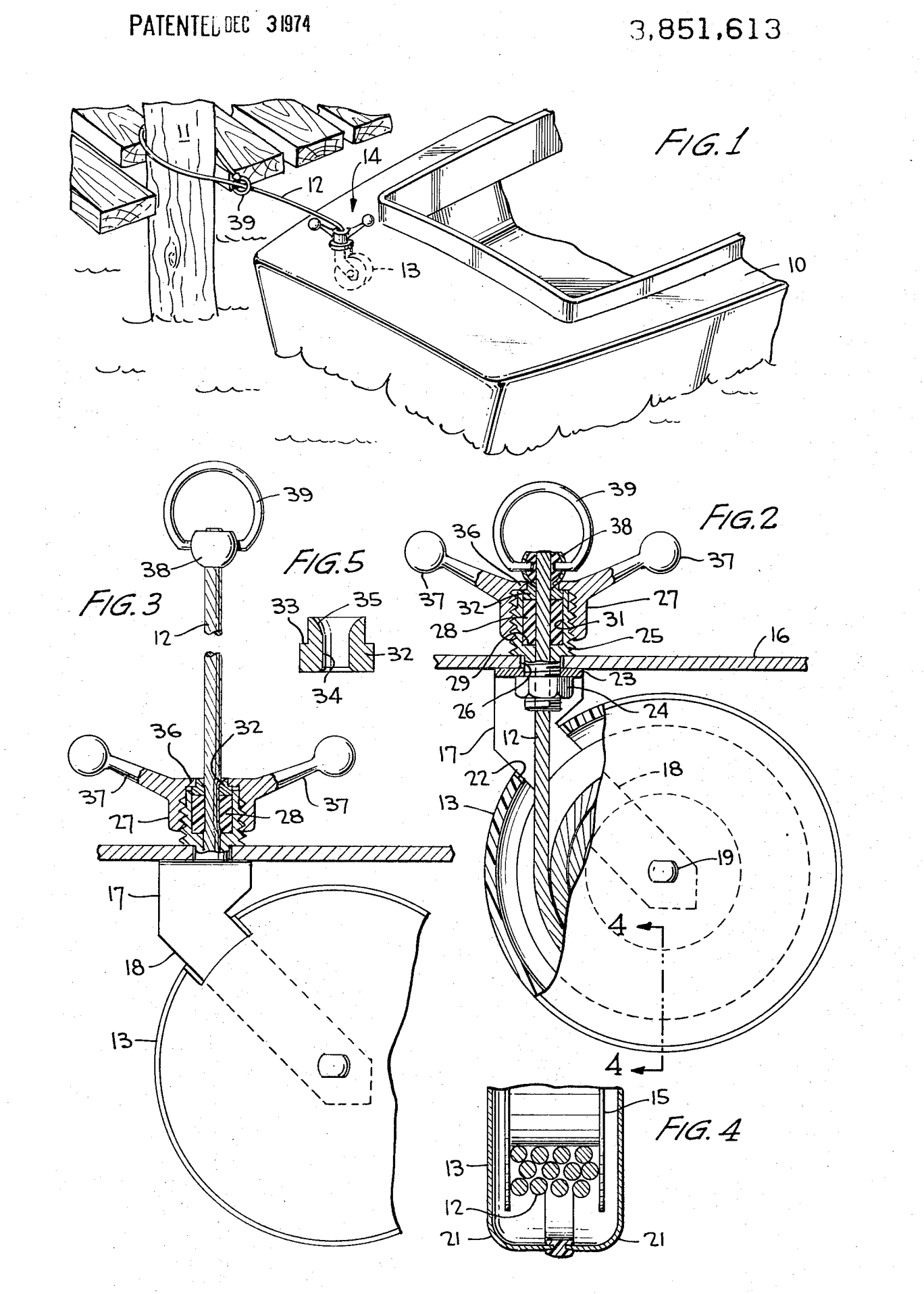

Turning now to the drawings wherein like reference characters refer to like and corresponding parts throughout the several views, the aft portion only of a boat 10 is shown in FIG. 1 tied down to a mooring post 11 by means of the standard tie line 12 wound about a spring-reel 13 and clamped in place by means of clamp assembly 14 in accordance with the present invention.

The assembly is shown in more detail in FIGS. 2 and 3 as comprising reel 13 having the standard spring mechanism (not shown) therein for retracting the tie line and maintaining it wound-up on a spool 15 in a manner as shown in FIG. 4. The spring reel is mounted to the underside of surface 16 of the board deck by means of a U-shaped strap 17. Legs 18 of the strap are secured to the spool axle 19 at the inner surfaces of covers 21 of the reel. Each leg 18 extends into the reel through suitable openings 22 provided in covers 21. A flat connecting portion 23 for the legs is mounted to the underside of deck 16 by means of nut 24 in engagement with a hollow bolt 25 extending through a suitable opening 26 in the deck.

The means for clamping down tie line 12 in accordance with the present invention includes a hollow nut 27 threadedly engaged with bolt 25. A resilient and compressible annular gasket 28 of rubber composition or the like is disposed within hollow nut 25 and surrounds the tie line. The gasket is so dimensioned as to contact the lower wall 29 and inner side wall 31 of hollow nut 25, and an annular bushing 32 is seated on the gasket and likewise surrounds the tie line. As clearly shown in FIG. 5 the smaller diameter of bushing 32 at its upper end presents an annular shoulder 33, and the bushing has an axial opening 34 substantially equal in diameter to tie line 12. Opening 34 flares outwardly at its upper end as at 35.

Hollow nut 27 is provided with an annular inwardly directed flange 36 which is seated on shoulder 33 of bushing 32. Turning means are provided for nut 27 in the form of handles 37 to facilitate convenient manual tightening thereof. When it is desired to clamp the tie line in place, handles 37 are simply turned by the operator so as to tighten nut 27 about bolt 25 whereupon bushing 32 is moved downwardly and compresses gasket 28. The central annular opening of the gasket is thereupon constricted against the surrounded tie line (see FIG. 3) as the gasket is squeezed. Accordingly, a predetermined length of the tie line payed-out from its reel as in FIG. 3 is clamped in such position and is not capable of being released even accidentally unless hollow nut 27 is loosened.

A bead 38 is secured at the free end of the tie line to maintain it in a position outwardly of hollow nut 27 so that it will not accidentally be fully reeled into the reel. The bead is substantially spherical and is conveniently seated on flaring 35 of bushing 32 when in the retracted position of FIG. 2. A ring 39 is mounted on the bead to serve as a loop through which the tie line may be extended in mooring of the boat as shown in FIG. 1.

In operation, hollow nut 27 is loosened to permit a sufficient length of the tie line to be payed-out from its reel and looped over the mooring post. Hollow nut 27 is then simply tightened by means of handles 37 whereupon the resilient annular gasket 28 is compressed and its central opening constricted against the tie line to clamp it in place. Although a bushing 32 is used to bear directly against the gasket, it should be understood that flange 36 could itself be extended to bear against the gasket, thereby avoiding the need for the bushing. Also, only one clamp assembly 14 is shown at the aft end of boat 10 although it should be understood that more than one such clamp assemblies can be used in any position on the boat without departing from the spirit of the present invention. Moreover, any compressible resilient material other than rubber is capable of being used, and any other standard spring reel other than that shown is available for use in accordance with the invention.

Obviously, many other modifications and variations of the invention are possible within the light of the above teachings. It is therefore to be understood that within the scope of the appended claims, the invention may be practiced otherwise than as specifically described.

What is claimed is:

1. Clamp assembly for a boat tie line comprising: a rotatable reel mounted to a support surface of the boat; an elongated tie line wound about said reel; means for clamping said tie line comprising a hollow bolt secured to said support surface, a hollow nut in threaded engagement with said bolt, said bolt having an opening through which said tie line extends, said bolt opening including an enlarged coaxial recess having bottom and side walls, a resilient, elastomeric annular gasket disposed within said recess in contact with said walls and surrounding said tie line, an inwardly directed flange on said nut overlying said gasket and defining a coaxial opening through which said tie line extends, a bushing partially disposed within said recess and being in engagement with said flange, said bushing having a planar surface perpendicular to the axis of said tie line as it extends therethrough, said surface being in contact with the upper end of said gasket; and a bead element mounted on the free end of said tie line for maintaining said free end outwardly of said nut as said bead element rests against said flange, said gasket being compressed and its annular opening being constricted against the surrounded tie line to clamp it in place as said bushing is pressed against said gasket for compressing same upon a tightening of said nut.

2. The clamp assembly according to claim 1 wherein means are provided on said nut for turning same.

3. The clamp assembly according to claim 1 wherein the opening of said bushing is outwardly flared at its upper end for the reception of said bead element when in contact with said flange.

* * * * *